United States Patent [19]
Sweet

[11] 3,817,219
[45] June 18, 1974

[54] HEAT EXCHANGER

[76] Inventor: Theodore R. Sweet, 4617 Narragansette Ave., San Diego, Calif. 92107

[22] Filed: Jan. 12, 1973

[21] Appl. No.: 323,102

[52] U.S. Cl............ 122/260, 122/367 A, 122/367 C
[51] Int. Cl............................................. F22b 37/12
[58] Field of Search............ 122/4, 242, 260, 367 R, 122/367 C, 367 A

[56] References Cited
UNITED STATES PATENTS

| | | |
|---|---|---|
| 620,994 | 3/1899 | Teste .............................. 122/242 |
| 795,948 | 8/1905 | Voelpel ........................ 122/260 X |
| 1,735,438 | 11/1929 | Kline .................................. 122/260 |
| 1,829,148 | 10/1931 | Kline .................................. 122/260 |

*Primary Examiner*—Kenneth W. Sprague

[57] ABSTRACT

A heat exchanger for use in heating or cooling water, air or other fluid, wherein a plurality of hollow nodulated chambers connected in staggered array defines a sealed fluid passageway within a compartment whereby a fluid flowing through the compartment is brought into thermal contact with a fluid flowing through the inter-connected chambers.

6 Claims, 2 Drawing Figures

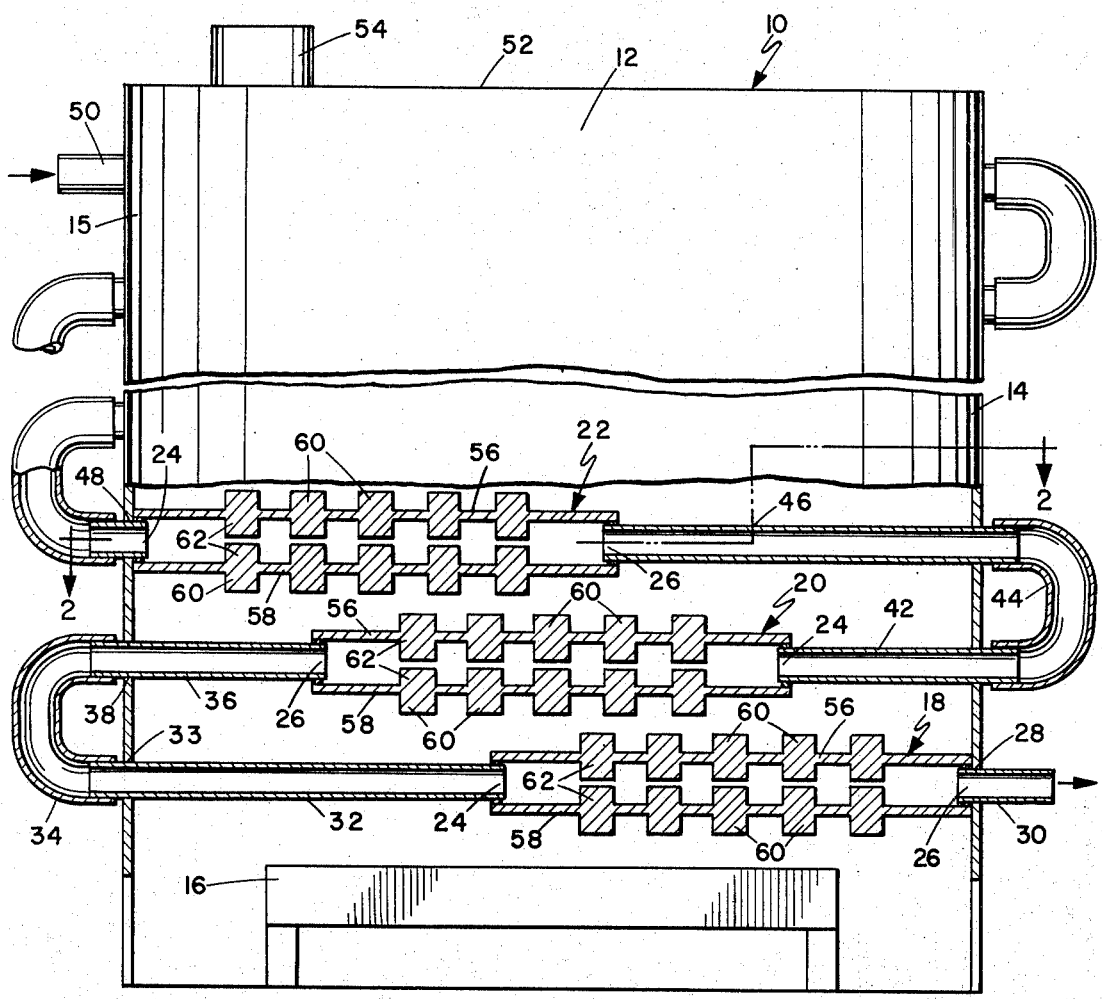
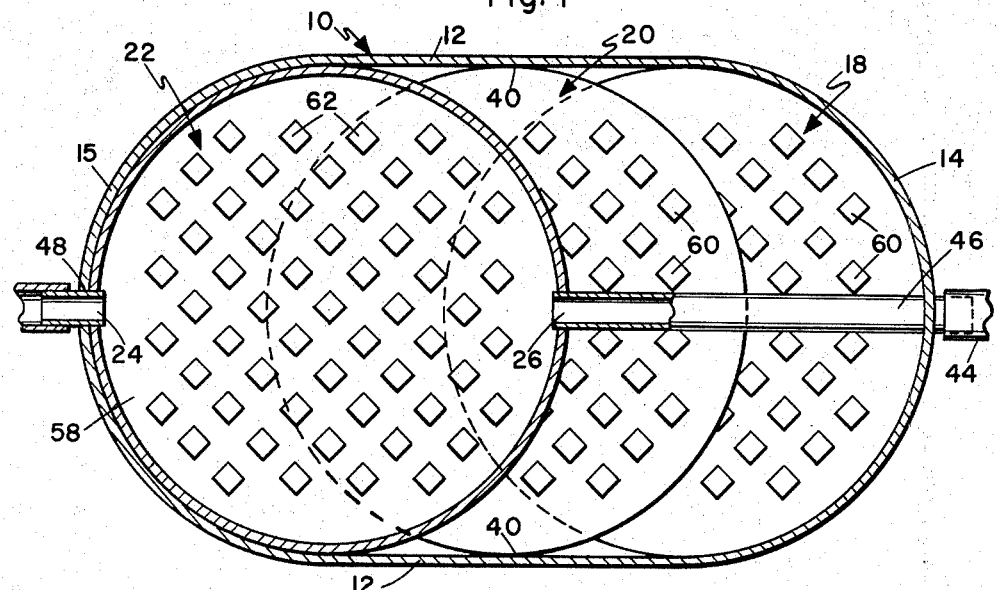

3,817,219

HEAT EXCHANGER

BACKGROUND OF THE INVENTION

The present invention relates to a heat exchanger, more particularly to a means of transferring heat from one fluid to another.

In the design of a fluid heat exchanger of the general type concerned, it is necessary that the two fluids which are to exchange heat are brought into as intimate thermal contact as is possible while remaining non-communicative. This is generally accomplished by providing two hermetically separate fluid passageways with a large coextensive heat conductive surface area. Additionally, it is desireable that the respective fluids contact all the available surface area evenly and that the apparatus remains as compact as possible while retaining the large inter-fluid surface area for heat transfer.

SUMMARY OF THE INVENTION

The apparatus herein disclosed and claimed meets the abovementioned criteria. A cylindrical compartment with two parallel side portions and two semi-circular end wall portions provides a passageway for the flow of a fluid. A plurality of hollow circular chambers are connected in series and connectable to a source of fluid and are disposed in staggered array within the compartment such that each chamber acts as a baffle for the fluid flowing through the compartment, causing the fluid to circulate around the several chambers. The chambers have walls which are provided on both sides with a waffle-shaped array of heat conductive projections which increase the area available for heat transfer between the walls and the fluid on both sides of the walls. The ranks and files of the waffle-shaped array are diagonally disposed to the general direction of fluid flow to promote even distribution of the fluids both inside and outside the chambers.

BRIEF DESCRIPTION OF THE DRAWINGS

FIG. 1 is a side elevation view, with portions cut away, of the heat exchange structure; and FIG. 2 is a typical sectional view taken on line 2—2 of FIG. 1.

DETAILED DESCRIPTION OF THE PREFERRED EMBODIMENT

For the sake of simplicity, the apparatus is described in its mode of operation as a fluid heater, though the invention is not confined to such operation.

Heating compartment 10 is constructed of a suitable heat resistant rigid material and is in the shape of a vertical cylinder with an ovate planform, shown in FIG. 2, with parallel side wall portions 12 and semi-circular end wall portions 14 and 15. The lower portion of the heating compartment is a heater 16 such as a gas burner. Mounted in the heating compartment above heater 16 are a plurality of horizontal disc-shaped hollow chambers indicated at 18, 20 and 22, it being understood that the total number of such chambers may be much larger. The radius of each chamber is equal to the radius of curvature of the semi-circular end wall portions 14, and each chamber has an inlet aperture 24 and an outlet aperture 26. The lowermost chamber 18 is horizontal and is mounted flush to end wall portions 14, so that the chamber is essentially sealed to the compartment along half of its circumference, with the outlet 26 of the chamber adjacent to an opening 28 in the compartment wall through which outlet pipe 30 communicates from outside the container with outlet aperture 26. Inlet aperture 24 accepts pipe 32 which communicates through an opening at 33 in the container to U-shaped sleeve 34 and a pipe 36 which passes through opening 38. Pipe 36 is parallel to and directly above pipe 32, and mates with the outlet 26 of chamber 20. Chamber 20 is horizontally disposed in the container and attached tangentially to the container at points 40 by spot welding or other means. Chamber 20 communicates with chamber 22 through pipe 42, U-shaped sleeve 44 and pipe 46 in a manner similar to the communication of chamber 20 to chamber 18, and chamber 22 is semi-circumferentially sealed to end wall portion 15, with its inlet 24 adjacent to opening 48 through which chamber 22 communicates by means of pipes and U-shaped sleeves to subsequent higher chambers which are arranged in a configuration duplicating the staggered configuration of the first three chambers, with the last chamber communicating with inlet pipe 50. The heating compartment preferably has a top 52 with a vent pipe 54 through which spent gases escape.

The disc-shaped chambers comprise an upper plate 56 and a lower plate 58 provided with outwardly directed heat conductive projections 60 and inwardly directed projections 62. The projections are preferably arranged in a waffle shape and are disgonally disposed to a line between the inlet and outlet of each chamber as shown disgrammatically in FIG. 2.

In the operation of the device, gas burner 16 produces hot gases which rise through the heating compartment, being deflected by each chamber toward subsequent higher chambers and at the same time these conbustion gases are separated into divergent streams by the diagonally oriented waffle-shaped configuration of the heat conductive projections on the chambers. The gases lose their heat to the large surface area of the chambers with their projections as the gases rise to the top of the heating compartment, where they escape into the atmosphere through vent pipe 54.

The fluid to be heated flows through the series of chambers from inlet pipe 50, being deflected and heated by inwardly projecting waffle-arranged projections 62, and finally exits the chamber in heated condition through outlet pipe 30.

The configuration of the compartment 10 permits construction of all the chamber 18, 20 and 22 to be uniform with consequent economy in manufacture, assembly and even in repair. The chambers will also be recognized as inherently constituting baffles for the rising combustion gases, thus achieving the dual purpose of heat transfer and maximized routing and baffling of the hot gases.

I claim:

1. A heat exchanger comprising:
   a compartment generally ovate in planform with semicircular vertical end wall portions and parallel flattened vertical side wall portions;
   said compartment having a heater mounted in the lower part thereof so that heated gases rise through said compartment during operation;
   a plurality of closed, horizontally extended generally circular chambers, with heat conductive walls, mounted in vertically staggered array within said compartment and connected end to end in series and connectable with a source of fluid to be heated;

certain of said chambers being secured within said end wall portions and certain others of said chambers being secured tangentially to and between said side wall portions;

said chambers being baffles controlling convection currents in heated gases within said compartment.

2. The structure of claim 1 wherein each of said walls has integral with the outer surface thereof a multiplicity of heat conductive porjections extending outwardly from said walls, all of said projections being physically separated, whereby the surface area for heat transfer between said chamber walls and said heated gases is increased.

3. The structure of claim 2 wherein said projections are arranged on said chamber walls in a waffle configuration to effect divergence of the flow of fluid in said container into a multiplicity of streams.

4. The structure of claim 1 wherein each of said walls has integral with the inner surface thereof a multiplicity of heat conductive projections extending inwardly into said chambers; and said projections are arranged on said chamber walls in a waffle configuration with the ranks and files of said projections being diagonally disposed to a line between said inlet and outlet.

5. The structure in claim 4 wherein each of said chamber walls has integral with the outer surface thereof a multiplicity of outwardly extending heat conductive projections arranged in a waffle configuration such that each outwardly extending projection is immediately opposite an inwardly extendin projection on each of said chamber walls for maximized heat conduction between the opposed projections.

6. The structure of claim 5 wherein said chambers are horizontally extended and said compartment has a vent in the top thereof and a heater in the lower portion thereof, whereby hot gases produced by the heater rise through the compartment in contact with said series-connected chambers and heat the fluid flowing within said chambers.

* * * * *